United States Patent [19]

Oshida et al.

[11] 4,076,504
[45] Feb. 28, 1978

[54] WASTE GAS PURIFICATION APPARATUS

[75] Inventors: Naoichi Oshida, Yokohama; Eiichi Ando, Kanagawa, both of Japan

[73] Assignees: Kabushiki Kaisha Sato Gijutsu Kenkyusho, Fujisawa; Shinagawa Furnace Co., Ltd., Tokyo, both of Japan

[21] Appl. No.: 709,649

[22] Filed: Jul. 29, 1976

[30] Foreign Application Priority Data

Aug. 14, 1975    Japan .................................. 50-98113

[51] Int. Cl.² .............................................. F23G 7/06
[52] U.S. Cl. ................................ 23/277 C; 23/277 R;
    23/262; 23/288 G; 423/210; 432/27; 432/215;
    110/8 A
[58] Field of Search ................ 23/277 C, 277 R, 262,
    23/288 G; 423/210; 432/27, 215; 110/8 A

[56] References Cited

U.S. PATENT DOCUMENTS

| | | | |
|---|---|---|---|
| 2,571,749 | 10/1951 | Norton, Jr. | 432/27 |
| 2,685,343 | 8/1954 | Permann | 432/27 X |

*Primary Examiner*—James H. Tayman, Jr.
*Attorney, Agent, or Firm*—George B. Oujevolk

[57] ABSTRACT

A waste gas purification apparatus having an elongated vertical hollow furnace shaft adapted to receive pebbles therein with a waste gas inlet at the lower end with a pebble discharge means at said lower end. At the top of the shaft is a narrow exhaust gas duct with a pebble feed chute, a pebble charge device and a pebble recirculating tube extending from the discharge hoppers to the charge device. A blower is coupled to the gas inlet for force feeding waste gas through said gas inlet. At the upper end of the shaft is an inactive travel zone. Between the inactive travel zone and the lower shaft is an intermediate shaft with a temperature control chamber in parallel with said intermediate shaft. Pebbles move downwards in the shaft from the inactive travel zone to the discharge hoppers and are recirculated to the upper end while waste gas is fed to the lower end and travels up through the shaft, a portion of the gas passing through the temperature control chamber, the clean gas leaving the upper end.

1 Claim, 6 Drawing Figures

WASTE GAS PURIFICATION APPARATUS

FIELD OF INVENTION

The invention is concerned with a method and devices for purifying waste gases from various industrial processes and machines containing such toxic components as odorous substances, unburned substances, combustible substances, etc..

DESCRIPTION OF PRIOR TECHNOLOGY

Up to this time, various waste gas purification methods have been developed and selectively adopted according to the nature of waste gas sources. These methods can generally be classified into the following categories: washing, combustion, adsorption, chemical deodorization, and soil-oxidation methods.

Among these waste gas purification methods, the combustion method usually produces superior results to other categories, and even in various combustion methods, direct combustion is more effective than catalytic combustion.

In conventional direct combustion, a waste gas is heated by gas or oil-burner combustion in a combustion chamber (reaction chamber), and toxic components in the gas are burned or thermally decomposed. The hot gas produced thereby is led to a heat-exchanger and is utilized for fuel saving by preheating the original waste gas.

However, since the heat-saving rate is multipass metallic heat-exchangers, most commonly used, shows such low values as 20 to 45%, the gas is inevitably exhausted from these heat exchangers at comparatively high tempertures. Therefore, when the subsequent removal of SOx and NOx is necessary, the gas must be cooled by a certain cooling device before being introduced into wet-type desulfurization and denitrization devices. In addition, heat-resisting steels used for the construction of these heat-exchangers are rather rapidly eroded by alkali oxides, alkali sulphates, sulphur oxides, vanadium oxides and other erosive substances. Dust depositted on the metal surface, also causes the lowering of heat-exchanging efficiency, and therefore must be removed by periodical cleaning. When the gas contains such substances, conventional metallic heat-exchangers may be rather unsuitable.

Furthermore, in order to realize maximum gas purification effect in a direct combustion process, the waste gas passing through the combustion chamber (reaction chamber) should be kept at an optimum temperature with a sufficient flow time required for the completion of deordorizing reactions. For this, a rather large inner space of the combustion chamber must be maintained at a considerably high temperature.

Therefore, if the efficiency of the heat-exchanger is low, fuel consumption and running cost are inevitably increased.

When the gas is heated by burner combustion, the flame extending from the burner nozzle forms a local stream with extremely high temperatures in the combustion chamber. This can be associated with a non-uniform gas-temperature distribution in the chamber.

BRIEF DESCRIPTION OF INVENTION

The first characteristic of the present invention is as follows: In a shaft furnace filled with pebbles or pellets of refractory or metallic material as heat-regenerating media, a zone in which the pebbles travel downward with mutual mixing, i.e., "an active travel zone" is formed below a fixed level during downward travel; a waste gas is led into the lower part of the active travel zone with sufficient high temperatures and flows upward through the voids of the hot filling; the gas is agitated by the active movement of the pebbles and absorbs heat from the surface of hot pebbles, thus forming uniform distribution of the gas-flow; oxidation and decomposition of toxic components in the gas i.e., gas-purification reactions, thereby can effectively be completed on the gas-solid interface.

The second characteristic of the present invention is the successful utilization of the active movement of pebbles in the active travel zone: This enables uniform distribution of gas temperature, pressure and flow, and, in addition, flow time required for the gas to pass through the voids of the filling is sufficiently lengthened; therefore, heat content of the gas and reaction heat of the combustible components can be effectively used for heating the pebbles, i.e., heat-regenerating media during downward travel in the upper part of the "active travel zone", resulting in remarkable improvement of the heat-exchanging efficiency of the shaft furnace; thus furnace fuel consumption is minimized or unnecessary and can be associated with extremely low operation costs.

The third characteristic of the present invention is such that the occurrence of back-firing can be completely prevented by the presence of numerous small voids in the filling, thus the safety of operation can be secured.

The fourth characteristic of the present invention is as follows: The shaft furnace is conceptionally composed of three parts, upper, intermediate and lower shafts which are generally bordered by the hot-gas-inlet level and the branch-gas-outlet level respectively, and connected to a temperature control chamber with a burner combustion system. The chamber is joined to the furnace shaft by a hot gas flue on the top and by a branch gas flue on the bottom, as explained in the later paragraph 7: By adjusting a damper provided in the branch gas flue or in the hot gas flue, the amount of hot gas, from the branch-gas-outlets, heated by burner combustion and led into the upper shaft through the hot-gas-inlets, can easily be controlled so as to obtain optimum temperature distribution in the upper shaft; when such gas heating is unnecessary, the entire amount of gas can be made to flow upward through the three parts of the shaft by closing the damper.

The fifth characteristic of the present invention is as follows: Pebbles, i.e., heat-regenerating media are continuously discharged from the furnace bottom with continuous charging at the top; this can be associated with continuous removal of dust led into the furnace with the waste gas, thereby high purification and thermal efficiencies are consistently secured without periodical cleaning of the furnace.

DETAILED DESCRIPTION OF INVENTION

Figure 3:
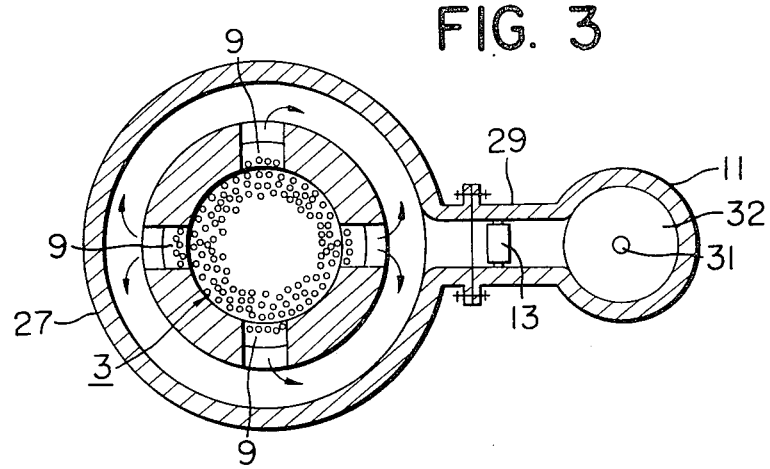
FIG. 3 is a horizontal section view at section III—III in FIG. 1.
Figure 4:
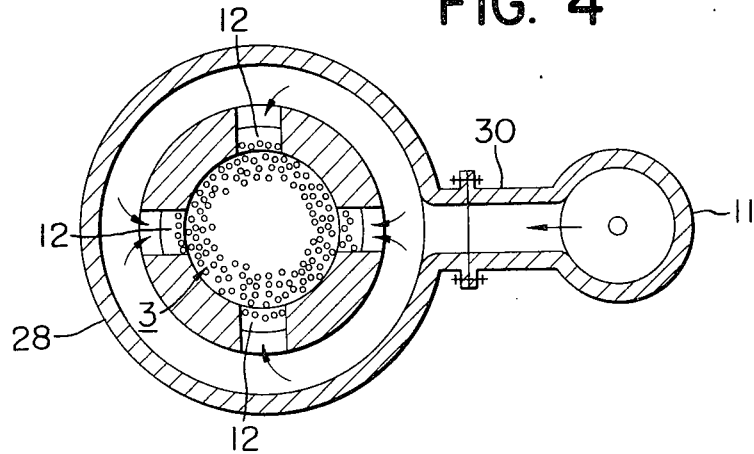
FIG. 4 is a horizontal section view at section IV—IV in FIG. 1.
Figure 5:
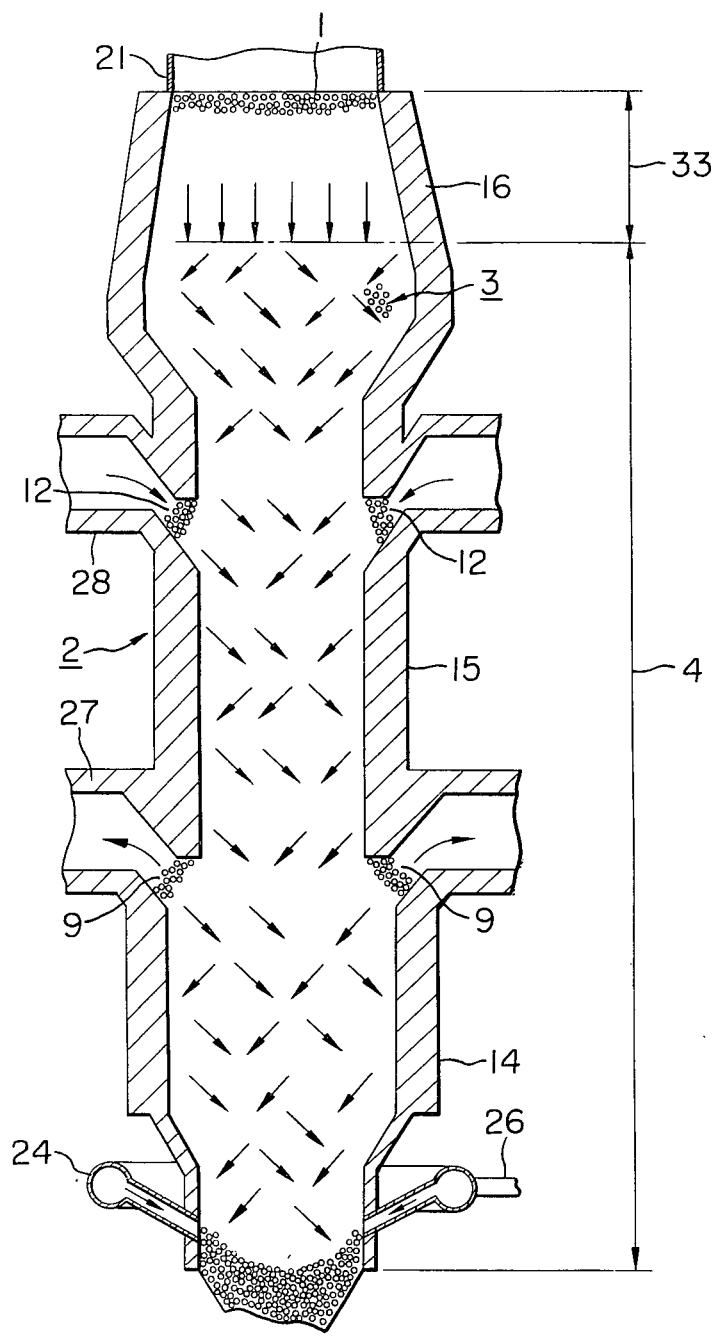
FIG. 5 is a vertical cross-section view of a furnace shaft according to the present invention, illustrating movement of pebbles during continuous downward travel.

FIGS. 1-4 show various section views of typical construction of the waste gas purification device based on the present invention, and FIG. 5 shows the movement of pebbles, i.e., heat-regenerating media contained in the shaft furnace during continuous downward travel. The entire furnace shaft 2, with round cross sections, is composed of three parts, a lower shaft 14, an intermediate shaft 15, and an upper shaft 16. Furnace shaft 2, is filled with such heat-regenerating media 1, as pebbles or pellets of refractory materials, metal oxides, metals, etc., resulting in the formation of a filling column 3. The bottom end of the furnace shaft 2, has a gas-tight joint with the 1st discharge hopper 6, having a pebble-discharge device 5, (e.g., a conventional screw-type discharge device), and several waste-gas-inlets 7, arranged at suitable intervals in the shell wall. The 2nd discharge hopper 18, with a discharge sluice 17, and the 3rd discharge hopper 20, with a discharge sluice 19, are joined in series to the said 1st discharge hopper 6. At the top of the said furnace shaft 2, an exhaust gas duct 21, is joined, while in the lower part of duct 21, a chute 22, from a pebble charge device 8, is inserted. The heat-regenerating media at the bottom of furnace shaft 2, are continuously discharged by the pebble discharge device 5, into the 2nd discharge hopper 18, and thereafter, completely discharged through the 3rd discharge hopper 20, by alternative opening and closing of the discharge sluices 17 and 19.

This discharge method enables gas pressure in the furnace to remain constant during continuous discharge. The discharged pebbles are conveyed to the pebble charging device 8, through a pebble recirculating device 23, usually consisting of a bucket elevator, a skip hoist, belt conveyors, etc., and are continuously recharged at the top of furnace shaft 2.

Around the lower part of furnace shaft 2, an annular waste-gas-supply main 24, is installed and is connected to several waste-gas-inlets 7, through respective inlet pipes with nearly radial arrangement. A waste gas from a certain industrial process or machinery is led to the said waste-gas-supply main 24, through a blower 25 and a waste gas line 26. At the boundary level between the lower shaft 14, and the intermediate shaft 15, several branch-gas-outlets 9, with upward inclination from inside to outside, are arranged in the furnace wall; at the boundary level between the intermediate shaft 15, and the upper shaft 16, several hot-gas-inlets 12, with upward inclination, are also arranged. The branch-gas-outlets 9, and the hot-gas-inlets 12, are connected to the respective gas mains 27 and 28, surrounding the furnace shell. The branch gas main 27, and the hot gas main 28, are connected with a single or double of branch gas flue 29, and hot gas flue 30, respectively. A temperature control chamber 11, is provided adjacent to the furnace shaft 2, and is connected to the shaft by the branch gas flue 29, at the bottom and by the hot gas flue 30, at the top. A damper 13, provided in the branch gas flue 29, enables adjustment of an amount of branch gas flow from the branch-gas-outlets 9.

The temperature control chamber 11, is also joined with a dust pocket 32, having a discharge sluice 31, and equipped with a heating device 10, usually a gas or oil combustion system. As described in paragraph 4, heat-regenerating media 1 are continuously discharged from the bottom of the furnace shaft 2, and continuously recharged at the furnace top. The filling column 3, of heat-regenerating media in the furnace shaft 2, travels downward at an extremely slow rate, maintaining the filled state. In this event, movement of heat-regenerating media constituting the filling column 3, must be appreciated as follows. In FIG. 5, the filling region 33, near the furnace top should be called "inactive travel zone", because the filling in this region can travel downward, only along the vertical planes of shear which are innumerably formed in the filling column. In other words, the downward travel of heat-regenerating media can be observed as quite static movement without any transverse mutual mixing at each level. Below the end level of the inactive zone 33, however, the filling can travel downward along the planes of shear with a fixed downward inclination angle which are innumerably formed in the filling, as shown by arrows. The region 4, thus formed, should be called "active travel zone," because heat-regenerating media in this region can travel downward with active transverse mutual mixing. This is the filling region, called "active travel zone 4," in the present invention.

The position of the boundary level between the inactive and active travel zones can be quantitatively determined as a function of furnace dimensions, values of bulk density and internal friction angle of the filling, by the "soil mechanical analysis" of the filling pressure in the shaft.

In a waste gas purification device provided with such construction and movement of heat-regenerating media as described above, low temperature waste gas to be purified (usually 10° to 70° C) containing, e.g., ammonia, hydrogen sulfide, hydrogen cyanide, etc., is led into the bottom of the lower shaft 14, through blower 25, waste gas line 26, waste-gas-supply main 24, and waste-gas-inlets 7. The waste gas flows upward through the voids of the heat-regenerating media in the said active travel zone 4.

As described later, heat-regenerating media heated to a high temperature travel downward through the boundary level between the intermediate and lower shafts. In the lower shaft 14, therefore, the downward travel of the hot heat-regenerating media with active transverse mutual mixing meets the upward flow of the cold waste gas from waste-gas-inlets 7. The active movement of heat-regenerating media can effectively contribute to unifying the temperature distributions of heat-regenerating media and waste gas flows at each furnace section level, and additionally cause mutual mixing of gas-flows through numerous voids in the filling. Under such conditions, the heat-exchange between surfaces of the heat-regenerating media and the gas can proceed along the extremely large heat-exchange area, with a sufficient heat-exchange time. Consequently, the waste gas is quite effectively preheated during upward flow in the lower shaft 14, and reaches the level of branch-gas-outlets 9, with a temperature of approximately 650° C. Partial oxidation and thermal decomposition of some toxic components in the waste gas, therefore, can begin even in the lower shaft 14, along the numerous interfaces between gas and heat-regenerating media.

At the boundary level between the lower shaft 14, and the intermediate shaft 15, a fixed amount of the waste gas (determined according to the given waste gas composition) can be branched to the temperature control chamber 11, through branch-gas-outlets 9, branch gas main 27, and branch gas flue 29. Flow resistance of the filling in the intermediate shaft 15, and additional adjustment of the damper 13, facilitate flow of the branched gas. The remaining waste gas is allowed to flow upward directly through the intermediate shaft 15, and is further oxidized and thermally decomposed.

In the temperature control chamber 11, dust suspended in the waste gas is deposited in dust pocket 32. The waste gas branched, if necessary, is heated to a desired temperature by the heating device 10, and is reintroduced into the bottom level of the upper shaft 16, through the hot gas flue 30, the hot gas main 28, and the hot-gas-inlets 12. In the upper shaft 16, the hot gas is joined and mixed with the waste gas flowing up through the voids of the filling in the intermediate shaft 15. The mixed gas temperature at the bottom level of the upper shaft should be controlled to approximately 800° C by controlling the hot gas temperature in the temperature control chamber 11. In the upper shaft 16, therefore, the downward travel of the cold heat-regenerating media charged at the furnace top meets the upward flow of the hot mixed gas. In this event, the cold heat-regenerating media can be heated to approximately 800° C by heat content of the gas and by exothermic reaction heat of the toxic components, during downward travel to the level of hot-gas-inlets 12. On the other hand, the gas is completely purified and cooled during upward flow through the voids of the filling, and is exhausted to atmosphere through the exhaust gas duct 21, at a temperature of approximately 100° C.

The furnace shaft 2, according to the present invention is so carefully designed that the said active travel zone with a sufficient height is formed in the upper shaft 16. The active movement of heat-regenerating media in the upper shaft 16, can undoubtedly be associated with the effective heat-exchange between hot gas and cold heat-regenerating media, as in the lower shaft 14.

When the waste gas to be processed contains a certain amount of combustible components, sufficient heat may be generated by oxidation and decomposition to maintain the heat-regenerating media at a required temperature. For the purification of such gases, heating of the branched gas by the heating device 10, in the temperature control chamber 11, is unnecessary. Therefore, the shaft furnace according to the present invention, can be operated without any fuel or heat source.

The heat-regenerating media used in the present invention should favourably be provided with such properties as easy absorption and emission of heat, stability at rather high temperatures, high compressive strength, easy movement in the filled state, etc.. As the said heat-regenerating media, therefore, such substances with spherical or nearly spherical shapes as metals, metal oxides, refractory materials, or their combined materials should preferably be selected in accordance with the nature of the given waste gas to be processed.

Figure 1:
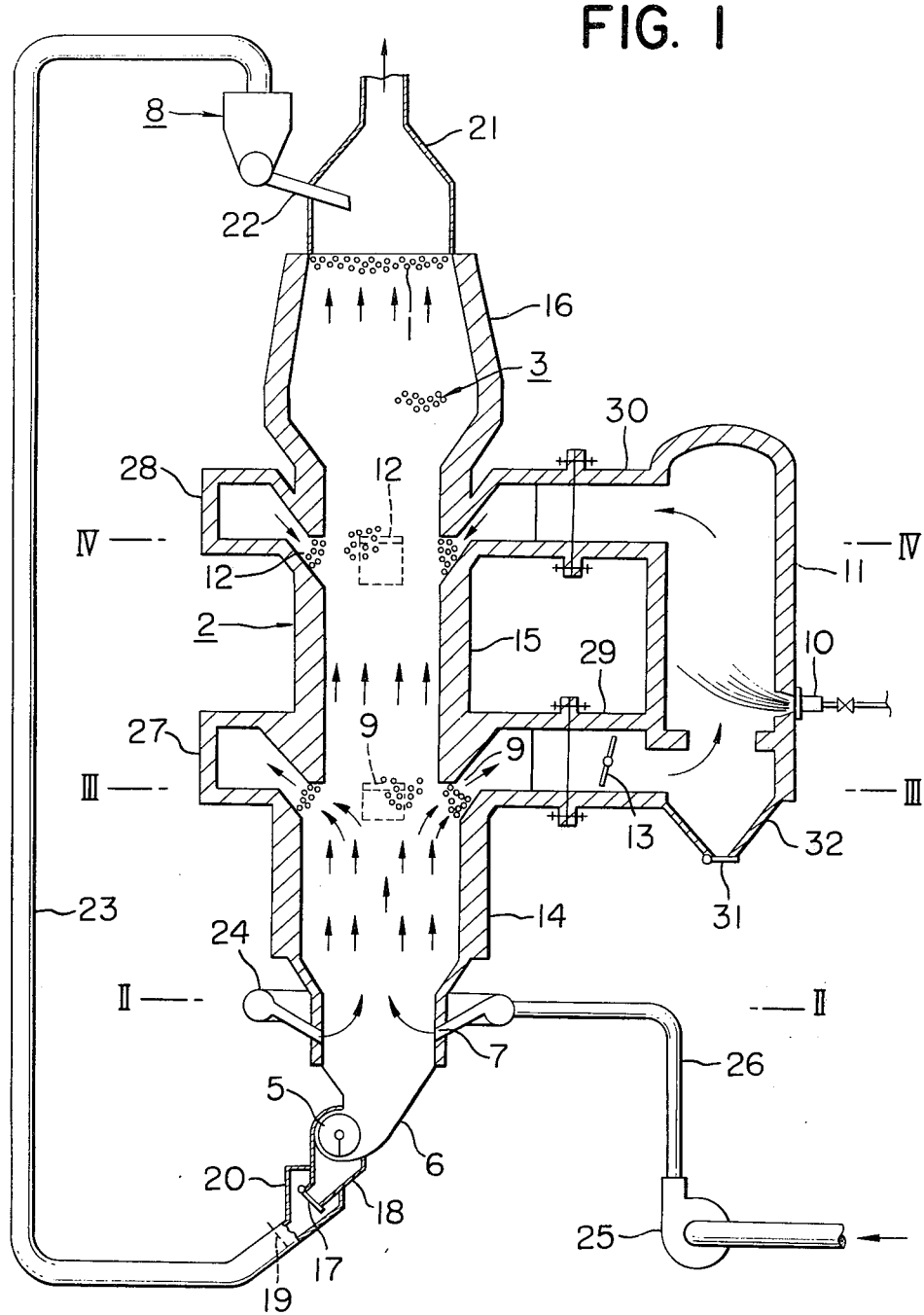
FIG. 1 is a vertical cross-section view of the waste gas purification device according to the present invention.

As shown in FIG. 1, the section of the upper shaft 16, is, in some cases, gradually enlarged to a certain level and is rather markedly reduced towards the bottom. The section of the lower shaft 14, is also reduced down to the waste-gas-inlet level and is further reduced to the discharge device level. The reduction in sectional area is effective in distributing the gas flow from the gas-inlets 12, or 7, to the central region of the filling. Enlargement of the section can necessarily lower the travel rate of the filling and the flow rate of the gas for securing the required reaction and heat-exchange times. Such reduction and enlargement in sectional area can also be associated with favorable reduction of the inactive zone height formed near the furnace top. When the furnace section is reduced in the region of the active travel zone, local remainders of the heat-regenerating media cannot occur, because of the active transverse movement.

Heating values of waste gases to be processed should be previously calculated from the analytical compositions. If the heating value of the given waste gas is found to be insufficient to obtain the required reaction temperatures, a proper amount of the gas should be branched to the temperature control chamber 11, by adjusting the damper 13.

In the shaft furnace according to the present invention, when the heating value of the given waste gas is approximately 25 kcal/Nm$^3$ or more, the required temperature for oxidation and thermal decomposition of the combustible components can be maintained by the reaction heat only. In such cases, heating of the branched gas in the temperature control chamber 11, is unnecessary.

Figure 2:
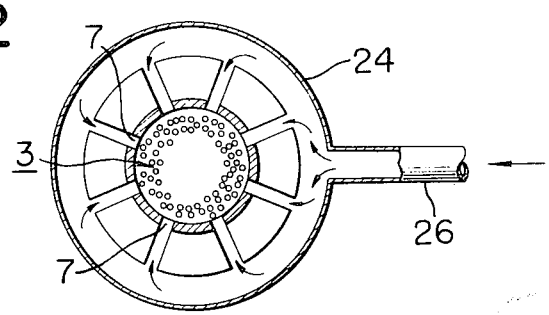
FIG. 2 is a horizontal section view at section II—II in FIG. 1.

Although, in FIGS. 2–4, a structure of the round-sectioned shaft furnace 2 is shown as an typical example, the present invention may be just as effective with furnaces 2, having rectangular cross-sections.

Although, in the above construction of the present invention, the dampers 13 are installed in the branch gas flue 29, they may just as well be installed in the hot gas flue 30, instead of the branch gas flue 29.

Although, in the above construction, the waste gas is forced to enter the furnace by blower 25, such blower may just as well be connected to the furnace top so as to suck the waste gas through the bottom openings of the furnace shaft 2.

Furthermore, the branch gas flowing out through branch-gas-outlets 9, may be led into a sludge incinerating device, where the sludge is incinerated by heat content of the preheated branch gas and self-combustion heat of the sludge. Thereafter, the produced gas can be reintroduced to the furnace shaft 2, through the hot-gas-inlets 12.

Figure 6:
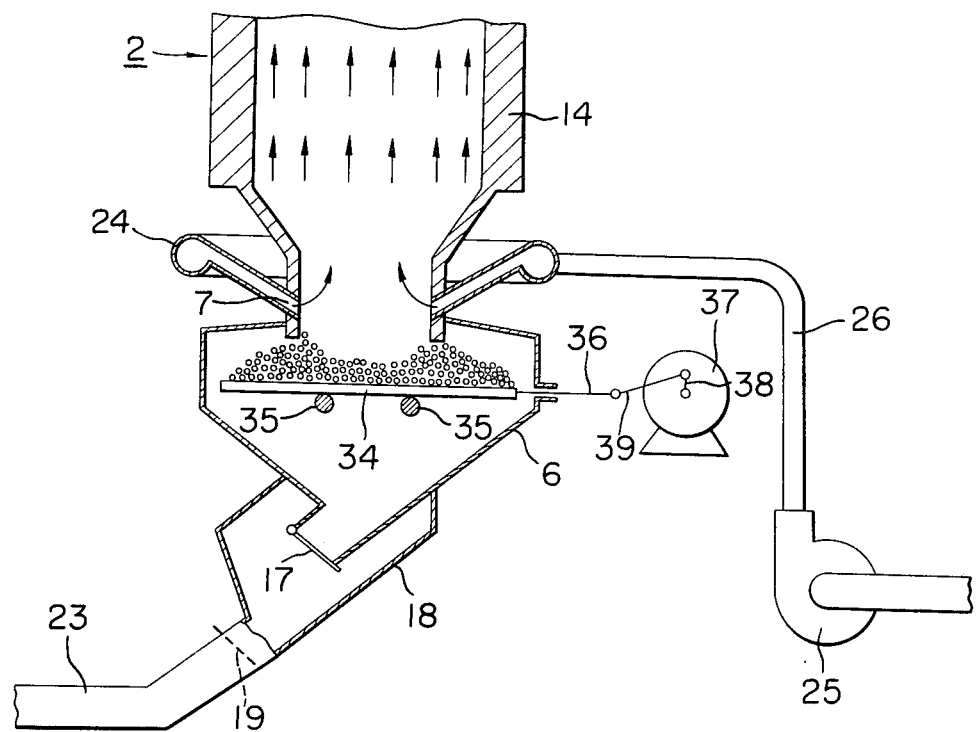
FIG. 6 is a vertical cross-section view illustrating another example of the pebble discharge device.

FIG. 6 shows another example of the pebble discharge device. The upper end of the 1st discharge hopper 6, is gas-tight joined to the lower shaft 14. Heat-regenerating media in the furnace shaft 2, is supported by a movable table 34, installed below the bottom opening of the lower shaft 14. Table 34, can horizontally reciprocate on support rollers 35, fixed in the 1st discharge hopper 6. Reciprocation of table 34, is accomplished by a piston-crank mechanism consisting of a piston rod 36, a connecting link 39, a crank 38, and a drive device 37. The piston rod 36 penetrates the hopper shell through a gas-tight guide and can be reciprocated with variable frequency and stroke. Thus, heat-regenerating media are continuously discharged from the lower shaft 14, into the 1st discharge hopper 6, at a given discharge rate.

The 1st discharge hopper 6, is provided with the 1st sluice 17, at the end, and is gas-tight joined to the 2nd discharge hopper 18, with the 2nd sluice 19.

APPLICATION EXAMPLES OF PRESENT INVENTION

The waste gas purification device shown in FIGS. 1 – 4, was applied to purification of waste gases under the following conditions, and the results shown in Tables 1 and 2 were obtained.

Furnace Specifications:
(I) Dimensions of the waste gas purification device
1) Cross-sectional area of furnace top — 0.25 m²
2) Cross-sectional area of upper shaft at hot-gas-inlet level — 0.25 m²
3) Cross-sectional area of lower shaft at waste-gas-inlet level — 0.16 m²
4) Length of upper shaft — 0.8 m
5) Length of intermediate shaft — 0.9 m
6) Length of lower shaft — 1.6 m
7) Max. cross-sectional area of upper shaft — 0.36 m²
8) Cross-sectional area of intermediate shaft — 0.2 m²
9) Cross-sectional area of lower shaft bottom — 0.14 m²
10) Height of temperature control chamber — 1.2 m
11) Cross-section diameter of temperature control chamber — 0.6 m dia.

(II) Heat regenerating media
1) Material: Pellets of sintered iron oxide
2) Mean pellet dia.: 13 mm
3) Pellet discharge rate (Downward travel rate of filling): 0.6 m/h (III) Gas processing rate: 800 Nm³/h
(IV) Gas compositions: Shown in Tables 1 and 2.

As clarified from the results shown in Tables 1 and 2, decomposition or elimination of the odorous components in the waste gas was substantially completed. Comparing the results with those in other direct combustion methods (usually, 50 to 80 ppm NOx is formed in hydrocarbon decomposition), concentration of NOx is considerably small. This can easily be appreciated from the following features of the present invention.

Table 1
Results of application example 1

| | |
|---|---|
| 1) Gas temperature at waste-gas-inlet level | 65° C |
| 2) Gas temperature at branch-gas-outlet level | 600° C |
| 3) Gas temperature at hot-gas-inlet level (reaction temperature) | 750° C |
| 4) Gas temperature at furnace top (in exhaust gas duct) | 115° C |
| 5) Temperature of discharged pellets | 70° C |
| 6) Temperature of charged pellets | 60° C |
| 7) Max. temperature of pellets in furnace | 750° C |
| 8) Gas to be processed: Gas containing organic solvents | |
| 9) Concentration of odorous components in gas: | |
|     Toluene | 400 ppm |
|     Methyl ethyl ketone | 200 ppm |
|     Ethyl acetate | 220 ppm |
| 10) Fuel consumption in heating device | none |
| 11) Exhausted gas composition from furnace top: | |
|     Toluene | 1 ppm max.* |
|     CO | 10 ppm max.** |
|     NOx | 10–20 ppm *** |

*Determined by gas chromatography method.
**Determined by detection tube method.
***Determined by naphthylenediamine method.

Table 2
Results of application example 2

| | |
|---|---|
| 1) Gas temperature at waste-gas-inlet level | 25° C |
| 2) Gas temperature at branch-gas-outlet level | 650° C |
| 3) Gas temperature at hot-gas-inlet level (reaction temperature) | 800° C |
| 4) Gas temperature at furnace top (in exhaust gas duct) | 130° C |
| 5) Temperature of discharged pellets | 30° C |
| 6) Temperature of charged pellets | 20° C |
| 7) Max. temperature of pellets in furnace | 800° C |
| 8) Gas to be processed: Gas leaked from coal gas production process | |
| 9) Concentration of odorous components in gas: | |
|     Ammonia | 200 ppm |
|     Hydrogen cyanide | 85 ppm |
|     Hydrogen sulfide | 200 ppm |
| 10) Fuel consumption in heating device | kerosene 2.5–3.0 kg/h |
| 11) Exhausted gas composition from furnace top: | |
|     Ammonia | 1 ppm max.* |
|     Hydrogen cyanide | not detected* |
|     Hydrogen sulfide | 0.01 ppm max.* |
|     NOx | 40–50 ppm ** |
|     SOx | 200 ppm, approx*** |

*Determined by gas chromatography method.
**Determined by naphthylenediamine method.
***Determined by rosaniline method.

In conventional direct combustion processes, a flame extending from a burner nozzle forms a local stream with extremely high temperatures of up to 1800° C in a combustion chamber space, because of rather low efficiencies of the attached heat-exchangers. This can be unfavorably associated with the increase of NOx content in the processed gas. According to the present invention, waste gases can be processed with extremely high thermal efficiencies and low fuel consumptions. This is because the heat-exchange between heat-regenerating media and gases, oxidation and decomposition of toxic components can effectively proceed with the active movement of heat-regenerating media in the active travel zone. For example, polluted air produced from the baking process of green carbon and tar-dolomite brick usually contains an amount of tar fumes corresponding to heating values of approx. 30 – 60 kcal/Nm$^3$. As shown in Table 1, waste gases with a heating value of approx. 25 kcal/Nm$^3$ can be processed without any additional fuel consumption. According to the present invention, the polluted air can be purified by self-combustion heat only.

We claim:

1. A waste gas purification apparatus comprising in combination:

(a) an elongated vertical hollow furnace shaft (2), with upper and lower ends and waste gas inlet means (7) at the lower end, said shaft being adapted to receive therein pebbles or pellets;

(b) a plurality of in series discharge hoppers (6, 18, 20) with a pebble discharge means (5, 17, 19) at said lower end;

(c) an exhaust gas duct (21) at the top of said shaft (2) said duct (21) having a lower part, a pebble feeding chute (22) coupled to said lower part, with a pebble charge device (8) and a pebble recirculating tube (23) extending from said discharge hoppers to said charge device (8);

(d) an annular waste gas supply main (24) around said lower end connected to said gas inlet means (7), blower means (25) coupled to said gas inlet means (7) for force feeding waste gas through said gas inlet means;

(e) an inactive travel zone (33) defined at said upper end having a widening section with a narrow outlet, a lower shaft (14) towards the lower end with a uniform cross-section; and, (f) an intermediate shaft (15) between said inactive travel zone (33) and said lower shaft (14), including a temperature control chamber (11) in parallel with said intermediate shaft, branch lines (27, 28) connecting said intermediate shaft and said temperature control chamber, including damper means (13) to control the flow of gas, a dust pocket (32) in said temperature control chamber, whereby pebbles or pellets move downwards in the shaft from the inactive travel zone (33) to the discharge hoppers and are recirculated to the upper end while waste gas is fed to the lower end and travels up through the shaft, a portion of the gas passing through the temperature control chamber, the clean gas leaving the upper end.

* * * * *